No. 744,485.

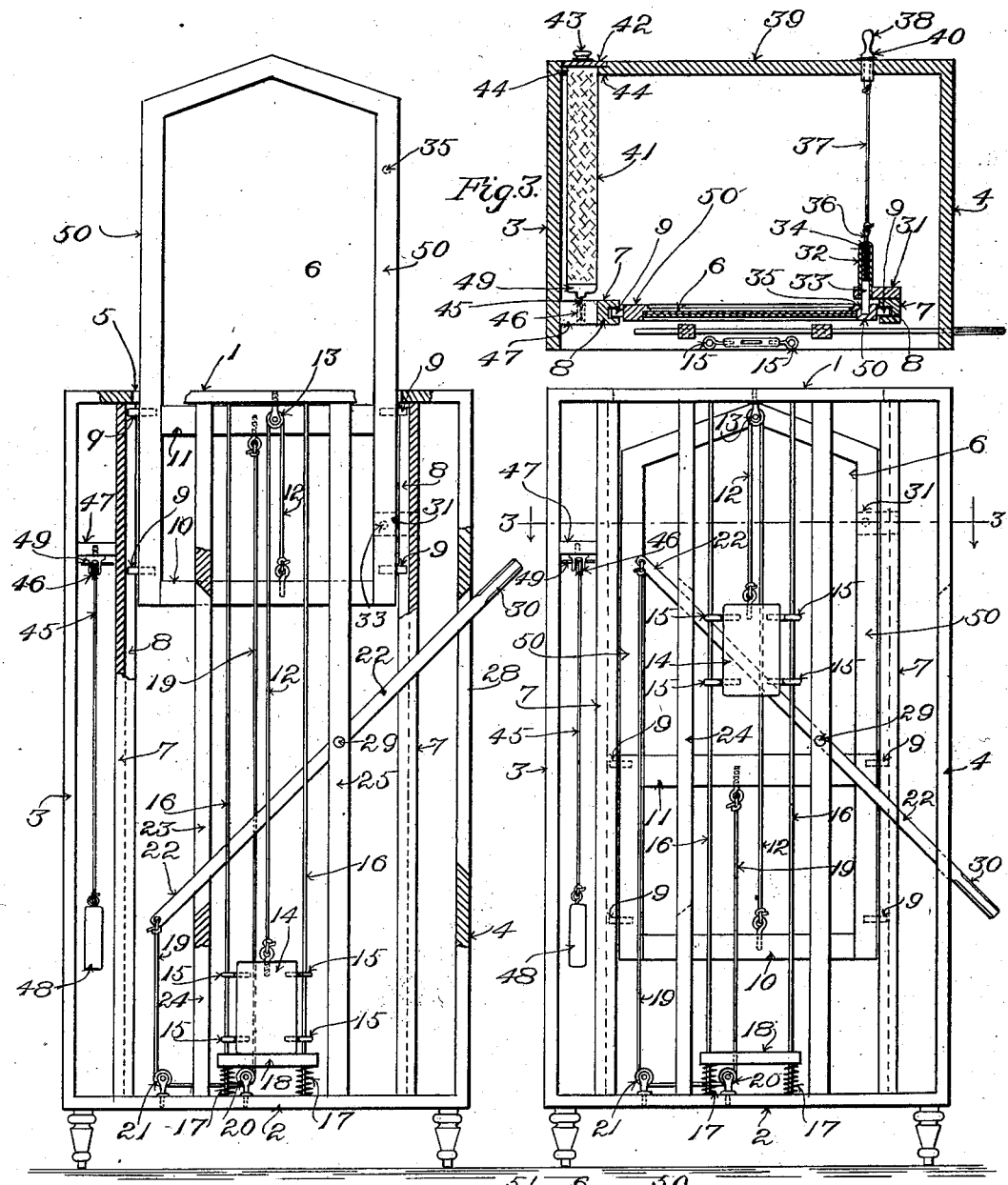

Patented November 17, 1903.

UNITED STATES PATENT OFFICE.

JOHN Q. A. CATE, OF ARLINGTON, MASSACHUSETTS.

COMBINATION TOILET-CASE.

SPECIFICATION forming part of Letters Patent No. 744,485, dated November 17, 1903.

Application filed February 28, 1903. Serial No. 145,521. (No model.)

*To all whom it may concern:*

Be it known that I, JOHN Q. A. CATE, of Arlington, in the county of Middlesex and State of Massachusetts, have invented certain new and useful Improvements in Combination Toilet-Cases, of which the following is a specification.

The main object of this invention is to produce a cabinet—such as a chiffonnier or other form of dressing-case, bureau, or the like—having a disappearing mirror.

The invention will now be fully described by reference to the accompanying drawings, and the novel features will be particularly pointed out in the claim at the close of the specification.

In the drawings, Figure 1 is a rear elevation, partly broken away, of a cabinet illustrating the invention, the back sheathing being omitted to more clearly show the interior mechanism of the device. In this figure the mirror is shown in its elevated or exposed position. Fig. 2 is a rear elevation showing the mirror in its lower or concealed position.
Fig. 3 is a horizontal section on line 3 3 of Fig. 2. Fig. 4 is a top plan, partly broken away, showing the hinged cover which closes the mirror-opening when the mirror is lowered into the cabinet.

Referring now to the drawings, 1 is the top, 2 the bottom, 3 the left-hand side, (viewed from the rear,) and 4 the right-hand side, of the cabinet.

Through the top of the cabinet, near the rear part thereof, is a slot 5, through which the mirror 6 extends when in its raised position. A hinged flap-cover 51 drops down and closes the opening when the mirror is inside the cabinet.

Inside of the cabinet, at opposite ends of the slot, are the standards 7 7. In the sides of these standards, facing each other, are vertical grooves 8. Projecting from the sides of the frame of the mirror are pins 9, which move in the guide-grooves 8 when the mirror is moved up and down.

Mechanism is provided by means of which the mirror can be raised into view above the top of the cabinet and when desired may be lowered inside of the cabinet. The mechanism shown for doing this is as follows: The side bars of the mirror-frame are united by a cross-bar 10 at the lower ends and also by a cross-bar 11 at some distance above the bottom. Fastened to the lower cross-bar 10 of the mirror-frame is one end of a cord 12, which passes up over a pulley 13, secured to the top 1 of the cabinet, thence down to a weight 14, with which it is also connected. The weight is provided with eyes 15, projecting from its sides, and through said eyes pass the vertical guide-rods 16. Coiled around the lower ends of said guide-rods are springs 17, and mounted on said springs is a seat 18, which forms a cushion for the weight. Fastened to the intermediate cross-bar 11 of the mirror-frame is one end of a cord 19, which passes down around a pulley 20, secured to the lower part of the cabinet, thence around a second pulley 21 in the lower part of the cabinet, and thence up to one end of a lever 22, with which it is connected. Said lever 22 passes through a slot 23 in the standard 24, a slot (not shown) in standard 25, and slot 28 in the side 4 of the cabinet, and is fulcrumed on a pivot 29 in the slotted standard 25. The slots through which the lever passes are long enough to permit sufficient movement of the lever in a vertical plane to raise and lower the mirror the distance desired. By pressing down on the handle 30 of the lever it is obvious that through the cord 19 and the pulleys around which it passes the mirror will be pulled down, and through the cord 12 and pulleys around which it passes the weight 14 will be raised, and that when the weight 14 descends the mirror will be raised.

When the mirror is fully lowered, it will be locked, by means hereinafter described, to prevent the weight 14 from falling, and thus raising the mirror until it is unlocked. When the mirror is unlocked and the lever 22 is left free to move on its fulcrum, the weight 14 will descend and raise the mirror. As the mirror rises it will engage the flap-cover and throw it open. Preferably the top of the mirror-frame is beveled rounding, so that it will strike the cover on the side opposite the hinge.

The mechanism for fastening the mirror in its elevated position is as follows: Projecting laterally from the standard 7 is a bracket 31, supported by which in a horizontal position in front of one of the side bars 9 of the mirror-frame is a barrel 32, within which is a pin or bolt 33, whose forward end is pressed by a spring 34 within the said barrel 32, said spring tending to press the said pin against the side bar of the mirror-frame, and when the mirror is in its lowermost position the said bolt 33 is in alinement with a socket 35 in the said side bar and is forced into said socket by said spring. Fastened to the shank 36 of said bolt is a cord 37, whose other end is connected to a pull-lever 38, which works through a hole in the front 39 of the cabinet, the said pull-lever having a shoulder 40 to form a stop.

When it is desired to raise the mirror, the lever 38 is pulled, so as to withdraw the bolt 33 from the socket in the mirror-frame, and the weight will then descend and raise the mirror.

When it is desired to lower the mirror, the handle of lever 22 is pushed down, thereby causing the mirror to descend, and when it has descended far enough for the socket 35 to come into alinement with the bolt the spring 34 will throw the bolt into the socket and hold the mirror against elevation by the weight until the bolt is again withdrawn. After the handle has been pushed down to lower the mirror, as just described and as shown in Fig. 2, as soon as the hand is removed from the handle 30 the arm of the lever on the other side of the fulcrum from the handle, being heavier than the handle side of the lever, will drop by gravity and raise the handle. The advantage of having the lever heavier on one side, so as to drop as described, is to avoid the necessity of having the weight 14 move the lever, so that the weight 14 need be only sufficient to overcome the weight of the mirror.

It is obvious that springs may be made to do the work of the weights.

What I claim is—

In combination with a cabinet, a mirror, a slot in the top of the cabinet for the passage of the mirror, a lever pivoted within the cabinet one arm of which projects through an opening in the side of the cabinet, a flexible connection between the inner arm of the lever and the mirror whereby the mirror may be drawn into the cabinet by operating the lever, means for fastening the mirror in its lowered position, and mechanism which tends to raise the mirror and which does raise and hold it in its raised position when the fastening is released, substantially as described.

In testimony whereof I have affixed my signature in presence of two witnesses.

JOHN Q. A. CATE.

Witnesses:
  WILLIAM A. COPELAND,
  OSCAR F. HILL.